United States Patent [19]

Ito

[11] Patent Number: 5,309,285

[45] Date of Patent: * May 3, 1994

[54] ZOOM LENS SYSTEM FOR USE WITH A COMPACT CAMERA

[75] Inventor: Takayuki Ito, Tokyo, Japan

[73] Assignee: Asahi Kogaku Kogyo Kabushiki Kaisha, Tokyo, Japan

[*] Notice: The portion of the term of this patent subsequent to Nov. 10, 2009 has been disclaimed.

[21] Appl. No.: 945,433

[22] Filed: Sep. 14, 1992

Related U.S. Application Data

[63] Continuation of Ser. No. 589,565, Sep. 28, 1990, abandoned.

[30] Foreign Application Priority Data

Sep. 29, 1989 [JP] Japan .................. 1-254809

[51] Int. Cl.$^5$ .............................................. G02B 15/14
[52] U.S. Cl. .................... 359/692; 359/676; 359/691
[58] Field of Search ............... 359/646, 676, 691–693, 359/746, 765, 688

[56] References Cited

U.S. PATENT DOCUMENTS

| | | | |
|---|---|---|---|
| 4,469,412 | 9/1984 | Tajima et al. | 350/426 |
| 4,540,249 | 9/1985 | Mogami | 350/426 |
| 4,653,874 | 3/1987 | Takahashi et al. | 359/688 |
| 4,778,264 | 10/1988 | Matsumura et al. | 359/676 |
| 4,830,476 | 5/1989 | Aoki | 359/692 |
| 5,054,897 | 10/1991 | Ozawa | 359/691 |
| 5,071,235 | 12/1991 | Hori et al. | 359/692 |
| 5,162,947 | 11/1992 | Ito | 359/692 |

FOREIGN PATENT DOCUMENTS

| | | |
|---|---|---|
| 3026170A1 | 2/1981 | Fed. Rep. of Germany . |
| 3541583C2 | 7/1986 | Fed. Rep. of Germany . |
| 3902495A1 | 8/1989 | Fed. Rep. of Germany . |
| 56-128911 | 10/1981 | Japan . |
| 57-201213 | 12/1982 | Japan . |
| 60-48009 | 3/1985 | Japan . |
| 60-170816 | 9/1985 | Japan . |
| 60-191216 | 9/1985 | Japan . |
| 62-90611 | 4/1987 | Japan . |
| 62-113120 | 5/1987 | Japan . |
| 62-264019 | 11/1987 | Japan . |
| 64-57222 | 3/1989 | Japan . |
| 2102142A | 1/1983 | United Kingdom . |
| 2102143A | 1/1983 | United Kingdom . |
| 2184865A | 7/1987 | United Kingdom . |

OTHER PUBLICATIONS

Optik, vol. 53, No. 2, pp. 105–113.
Ulrich Greis, "Injection Molding of Plastic Optics," Symposium on Optical Surface Technology, *Proceedings* (Apr. 12–14, 1983), pp. 69–76.
Walter Besenmatter, "Zur Stabilisierung einfacher Variatoren mittels Asphären," *Optik*, vol. 57, No. 1 (1980), pp. 123–124.
M. Berek, *Grundlagen der praktischen Optik, Analyse und Synthese optischer Systeme*, Walter de Gruyter & Co. (1930), pp. 94–96.

*Primary Examiner*—Loha Ben
*Assistant Examiner*—Thong Nguyen
*Attorney, Agent, or Firm*—Sughrue, Mion, Zinn, Macpeak & Seas

[57] ABSTRACT

A zoom lens system for use with a compact camera comprises, in order from the object side, a first lens group having a positive focal length and a second lens group having a negative focal length and which performs zooming by changing the distance between the first and second lens groups. The first lens group comprises, in order from the object side, a subgroup 1a of a small power that is composed of a positive first lens and a negative second lens and a subgroup 1b of a large positive power that has a cemented surface of a negative power on the image side. The subgroup 1a has at least one aspheric surface that has a divergent amount of asphericity with respect to a paraxial radius of curvature.

16 Claims, 6 Drawing Sheets

ZOOM LENS SYSTEM FOR USE WITH A COMPACT CAMERA

This is a continuation of application Ser. No. 07/589,565 filed Sep. 28, 1990, now abandoned.

BACKGROUND OF THE INVENTION

The present invention relates to a zoom lens system that is suitable for use with a compact camera and which is subject to less constraints on back focus than zoom lens systems for use with single-lens reflex cameras. More particularly, the present invention relates to a zoom lens system of a two-group type that is small in size and which can be manufactured at a lower cost than conventional versions.

Conventional zoom lens systems for use with compact cameras are classified as two types, (A) a two-group type and (B) a three- or four-group type. Compared with type (A), zoom lens systems of type (B) have the advantage of requiring a small amount of lens movement but, on the other hand, they are not only large in size but also complex in construction. Because of these obvious differences from lens systems of a two-group type which are envisaged by the present invention, type (B) will not be described in detail hereinafter.

Compared to type (B), zoom lens systems of type (A) require a somewhat greater amount of lens movement but because of their simple lens configuration and mechanical structure, type (A) zoom lens systems have the advantage of ease in size reduction. Conventionally known zoom lens systems of a two-group type include version (A-1) that is described in Unexamined Published Japanese Patent Application Nos. Sho-56-128911, Sho-57-201213, Sho-60-48009, Sho-60-170816 and Sho-60-191216, version (A-2) that is described in Unexamined Published Japanese Patent Application Nos. Sho-62-90611, and Sho-64-57222, and version (A-3) that is described in Unexamined Published Japanese Patent Application Nos. Sho-62-113120 and Sho-62-264019.

Version (A-1) has a small back focus and requires a large rear lens diameter, so it has had the problem that the overall size of the camera incorporating said lens system cannot be reduced. A further problem with this lens system is that internal reflections between the film plane and the last lens surface and other unwanted phenomena are highly likely to occur.

With a view to solving these problems, the assignee has proposed improved versions of a two-group type the back focus of which is comparatively large in consideration of its use with compact cameras. Such improved versions are (A-2) which is of a five-group-six-element composition and which is capable of a zoom ratio of 1.5–1.6 and (A-3) which is of a six-group-seven-element composition or seven-group-eight-element composition and which is capable of a zoom ratio on the order of 1.7–2.5. These versions range from a six-element composition capable of a zoom ratio of ca. 1.5–1.6 to an eight-element composition capable of a zoom ratio of at least 2. However, these proposals have been unable to satisfy the need for providing a zoom lens system for use with a compact camera that is even more compact and less expensive.

The present invention has been accomplished in order to meet this need of the prior art and its principal object is to provide a zoom lens system suitable for use with a compact camera which is basically an improvement over the version (A-2) described in Unexamined Published Japanese Patent Application No. Sho-64-57222 in that the achievable zoom ratio and the less composition are substantially the same as in (A-2) but which yet is not only smaller in size but also less expensive on account of the extensive use of a low-refractive index glass or plastic material.

SUMMARY OF THE INVENTION

The zoom lens system of the present invention for use with a compact camera comprises basically, in order from the object side, a first lens group having a positive focal length and a second lens group having a negative focal length and performs zooming by changing the distance between the first and second lens groups. In accordance with a first aspect of the present invention, said first lens group comprises, in order from the object side, a subgroup 1a of a small power that is composed of a positive first lens and a negative second lens and a subgroup 1b of a large positive power that has a cemented surface of a negative power on the image side; said subgroup 1a has at least one aspheric surface that has a divergent amount of asphericity with respect to a paraxial radius of curvature is such a way as to satisfy the following condition (5); and said zoom lens system further satisfies the following conditions:

$$N_{1a-1} < 1.65 \tag{1}$$

$$N_{1a-2} < 1.65 \tag{2}$$

$$\frac{f_1}{|f_{1a}|} < 0.25 \tag{3}$$

$$0.9 < \frac{f_1}{f_{1b}} < 1.25 \tag{4}$$

$$-50 < \Delta I_{1a} < -5. \tag{5}$$

In accordance with a second aspect of the present invention, either one or both of the first and second lenses in subgroup 1a is formed of a plastic material; if the first lens is formed of a plastic material, the following condition is satisfied:

$$(m_{1a-2} \cdot m_{1b} \cdot m_{2L})^2 < 0.3 \tag{6}$$

if the second lens is formed of a plastic material, the following condition is satisfied:

$$(m_{1b} \cdot m_{2L} - m_{1a-2} \cdot m_{1b} \cdot m_{2L})^2 < 0.6 \tag{7}$$

if both the first and second lenses are formed of a plastic material, the following conditions is satisfied:

$$(m_{1b} \cdot m_{2L})^2 < 0.3. \tag{8}$$

In accordance with a third aspect of the present invention, the second lens group comprises, in order from the object side, a positive meniscus lens 2-1 having a convex surface directed toward the image and a negative meniscus lens 2—2 having a concave surface directed toward the object, and the zoom lens system further satisfies the following additional conditions:

$$N_{2-1} < 1.65 \tag{9}$$

$$0.1 < \frac{|f_2|}{f_{2-1}} < 0.5. \tag{10}$$

In a fourth aspect of the present invention, the second lens in the first lens group is formed of a plastic material whereas lens 2-1 in the second lens group is formed of a plastic material, and the zoom lens system further satisfies the following additional condition:

$$(m_{2\text{-}2L} - m_{2L})^2 < 0.5 \tag{11}$$

In yet another aspect of the present invention, lens 2—2 in the second lens group further satisfies the following additional condition:

$$N_{2\text{-}2} < 1.65 \tag{12}$$

The symbols in conditions (1)–(12) have the following respective definitions:

$N_{1a\text{-}1}$: the refractive index at the d-line of the first lens in subgroup 1a;
$N_{1a\text{-}2}$: the refractive index at the d-line of the second lens in subgroup 1a;
$f_1$: the focal length of the first lens group;
$f_{1a}$: the focal length of subgroup 1a;
$f_{1b}$: the focal length of subgroup 1b;
$\Delta_{1a}$: the amount of change in the coefficient of a third-order spherical aberration caused by the aspheric surface in subgroup 1a (i.e., an aberrational coefficient as calculated on the assumption that the focal length of the overall system at the wide-angle end is 1.0);
$m_{1a\text{-}2}$: the lateral magnification of the second lens in subgroup 2a;
$m_{1b}$: the lateral magnification of subgroup 1b;
$m_{2L}$: the lateral magnification of the second lens group at the narrow-angel end;
$N_{2\text{-}1}$: the refractive index at the d-line of lens 2−1 in the second lens group;
$f_2$: the focal length of the second lens group;
$f_{2\text{-}1}$: the focal length of lens 2−1 in the second lens group;
$m_{2\text{-}2L}$: the lateral magnification of lens 2−2 in the second lens group at the narrow-angle end; and
$N_{2\text{-}2}$: the refractive index at the d-line of lens 2−2 in the second lens group.

According to the invention, the first lens group may include a plastic lens having a negative refractive power, and the second lens group includes a plastic lens having a positive refractive power. Although it is well known to cancel the focus movement against the changes in temperature and humidity by making the negative lens and the positive lens of plastic, it is possible to cancel the ambient change within the lens system since the two lenses are likely to be arranged adjacent to each other in the single lens group. However, according to the present invention, there is a unique arrangement such that these two lenses are arranged separately in the movable lens groups. Also, according to the invention, the lenses of the different refractive powers (i.e., positive and negative) are made of plastic, to thereby facilitate reduction of refractive powers of these lenses. If the power may be reduced, it is possible to suppress the deterioration inherent in the plastic lenses due to moulding errors and changes in environmental factors. Accordingly, it is possible to suppress the degradation in performance due to the moulding error or ambient circumstance changes.

Also, according to another aspect of the present invention, the first lens group may have a plastic lens interposed between glass lens elements, which leads to advantage that the system is free from an adverse affect of humidity. The plastic lens is likely to subjected to the humidity, and hence the plastic lens should be sealed by glass lenses within a lens barrel.

DETAILED DESCRIPTION OF THE CONDITIONS

Figure 1:
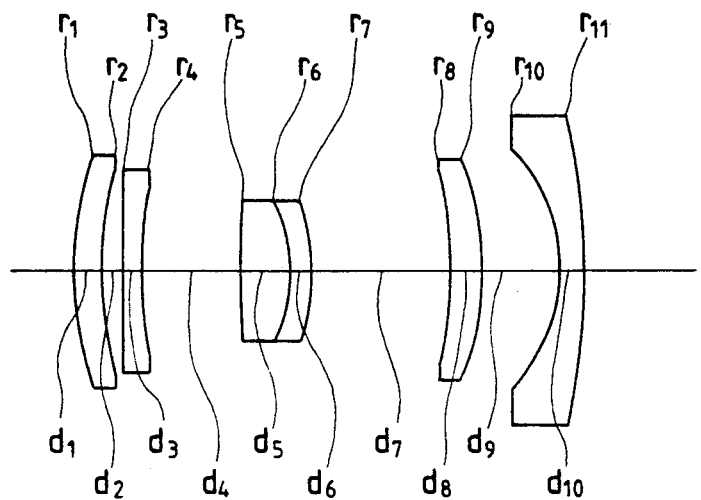
FIGS. 1, 3 and 5 are simplified cross-sectional views of the lens systems of Examples 1, 2 and 3, respectively, at the wide-angle end.
Figure 2A:
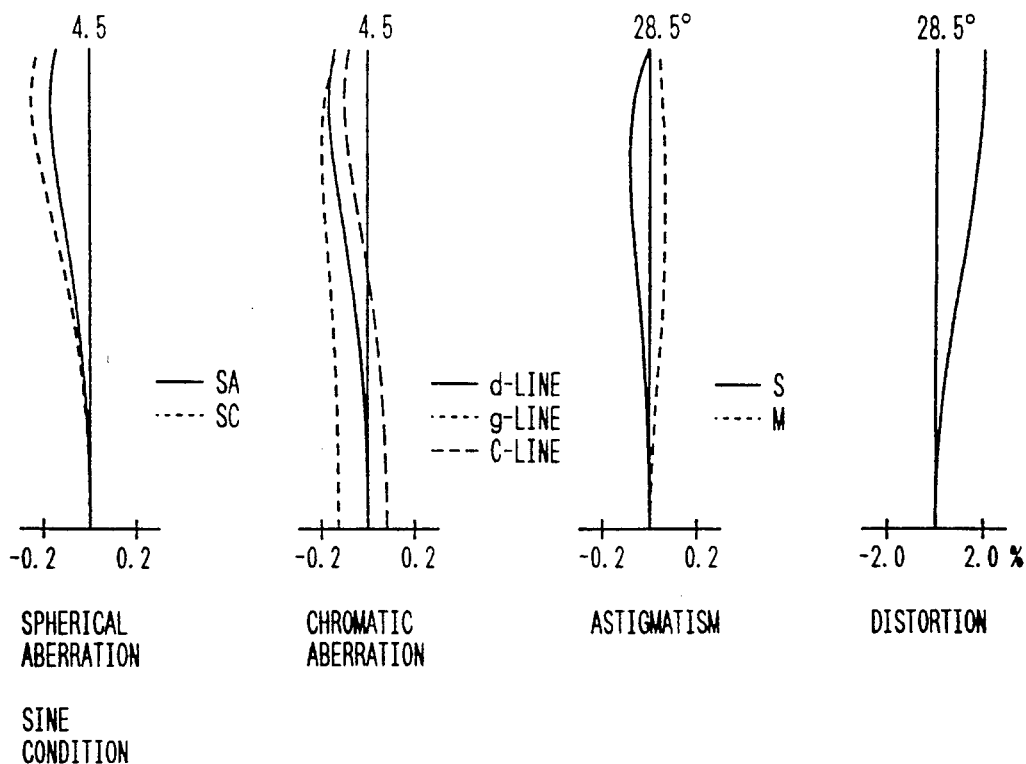
FIGS. 2A–2C, 4A–4C, and 6A–6C are graphs plotting the aberration curves obtained with the lens systems of Examples 1, 2 and 3, respectively, with (a) showing the state at the wide-angle end, (b), the middle-angle end, and (c), the narrow-angle end.
Figure 2B:
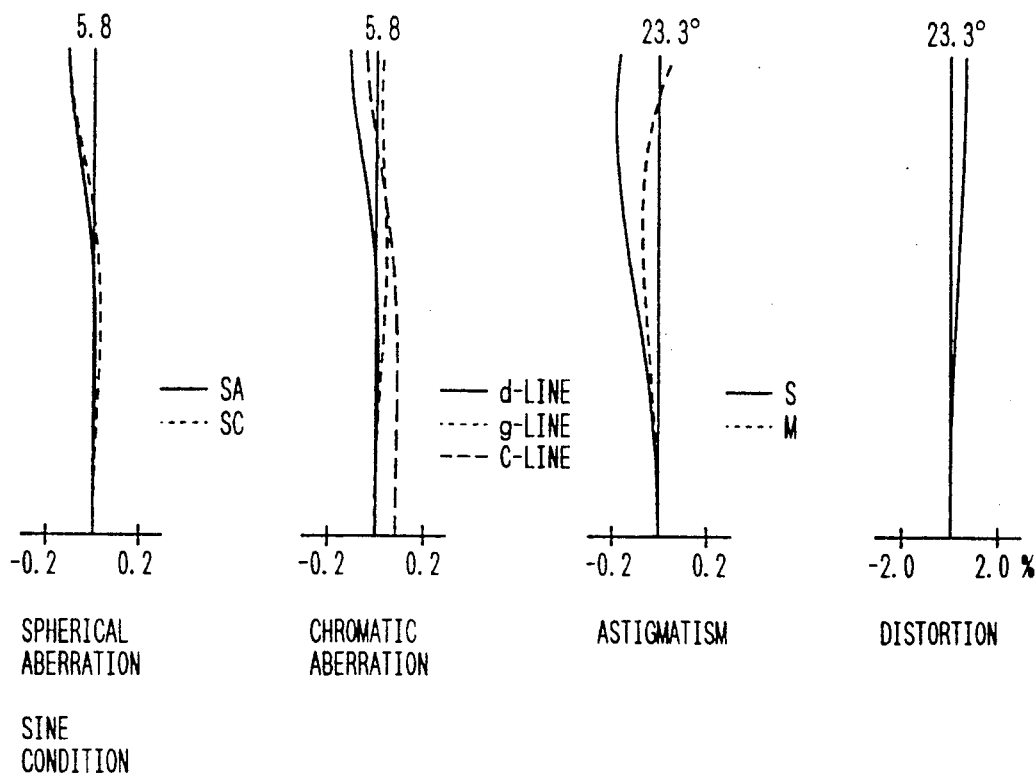
Figure 2C:
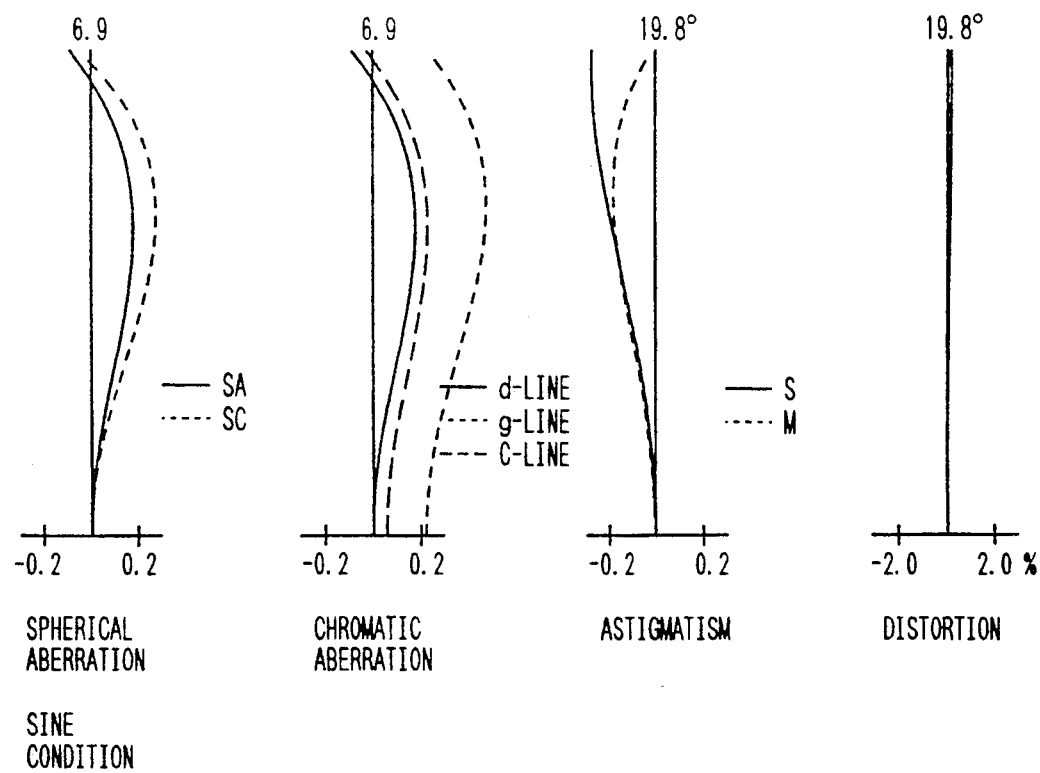
Figure 3:
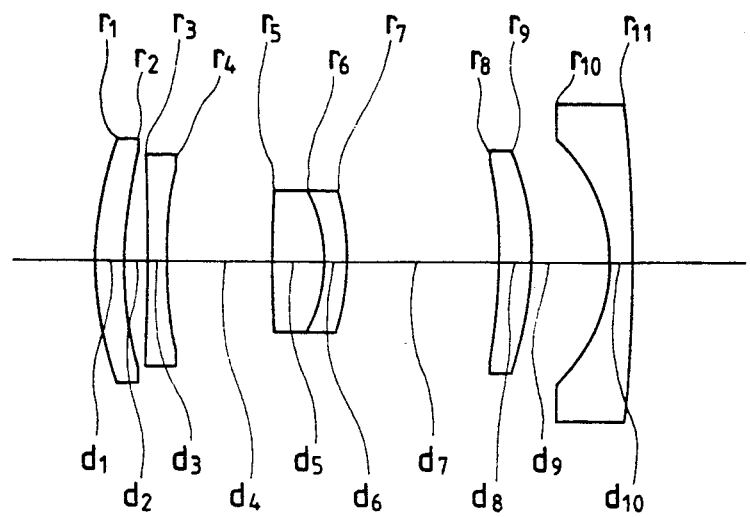
Figure 4A:
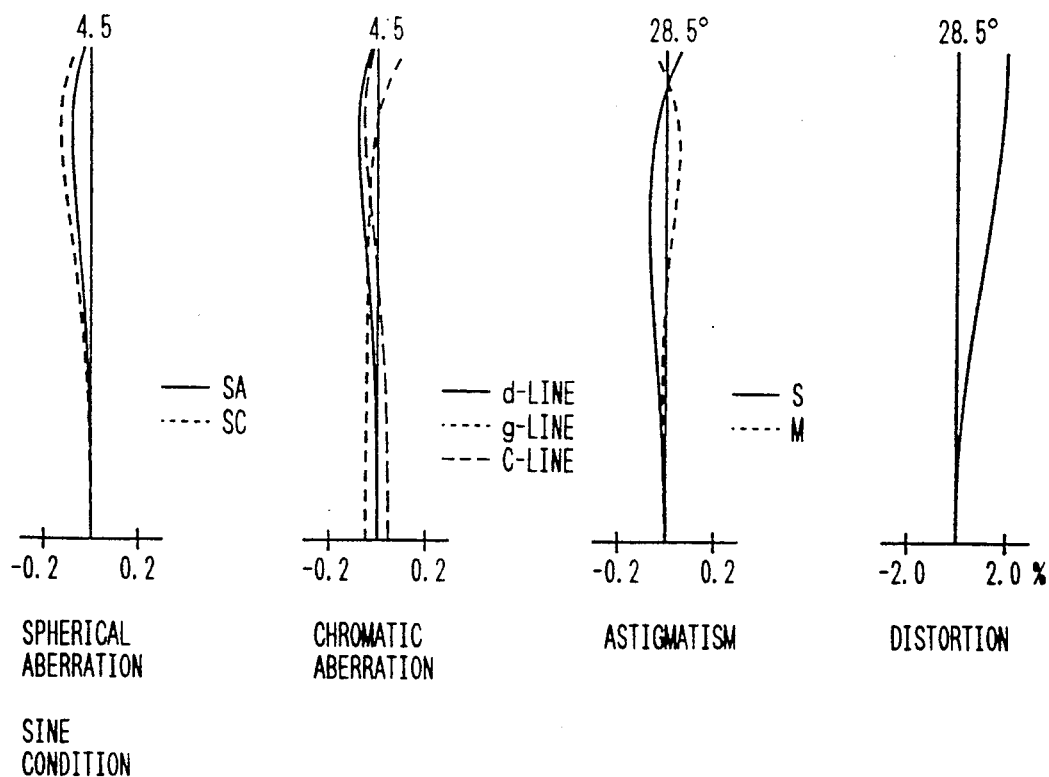
Figure 4B:
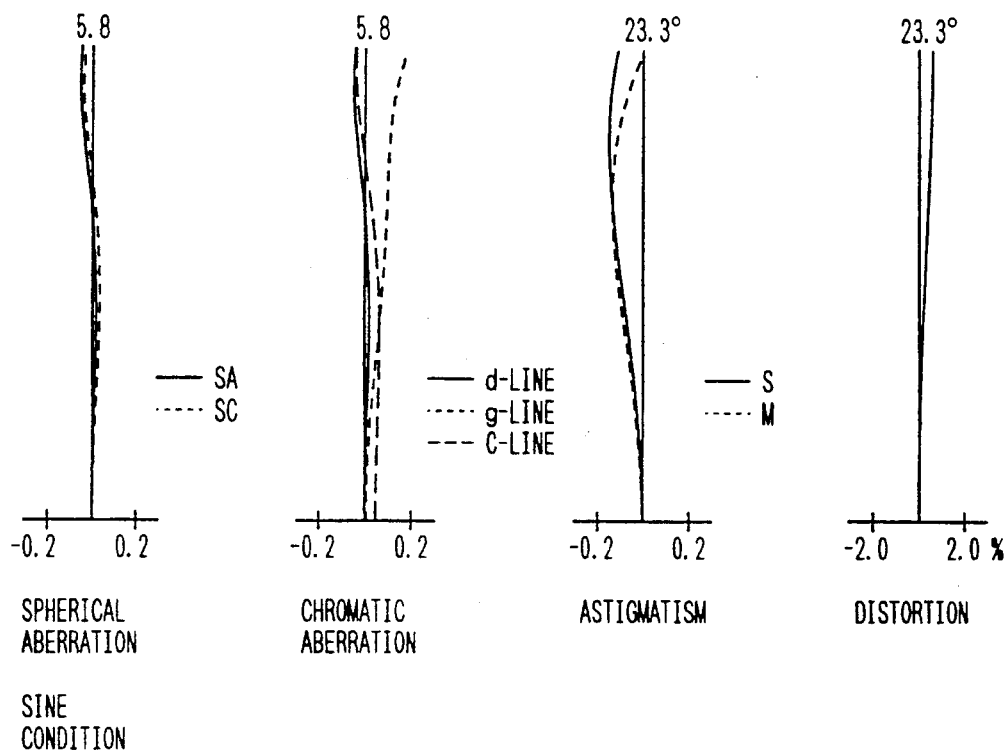
Figure 4C:
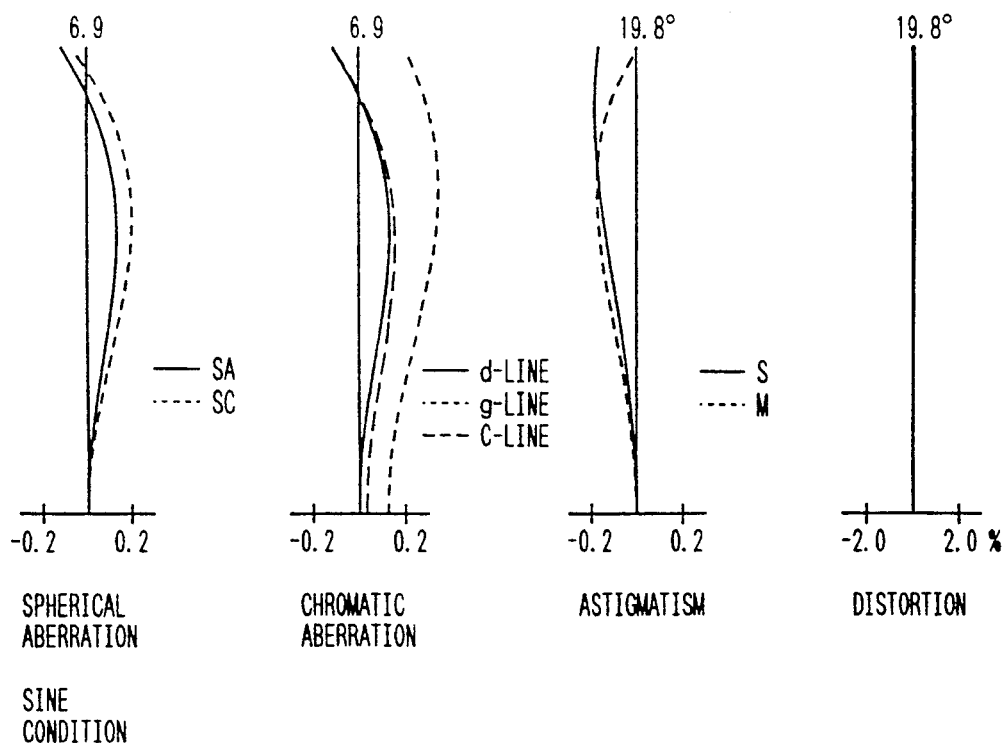
Figure 5:
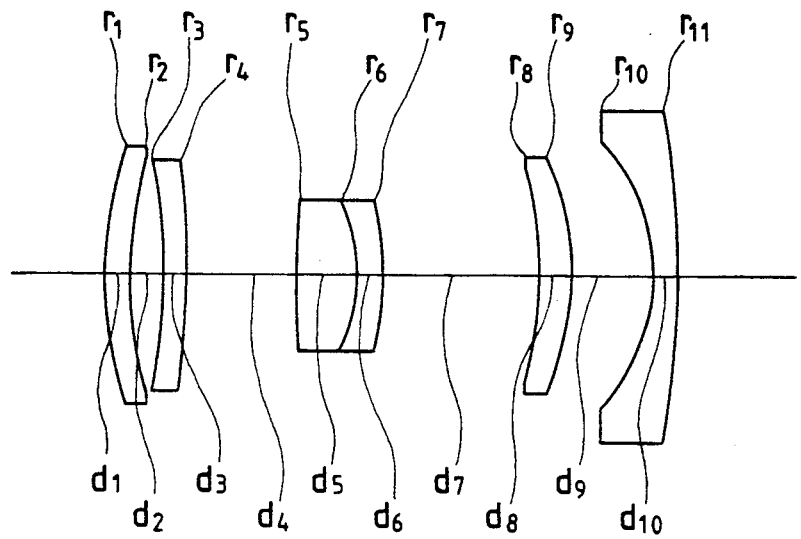
Figure 6A:
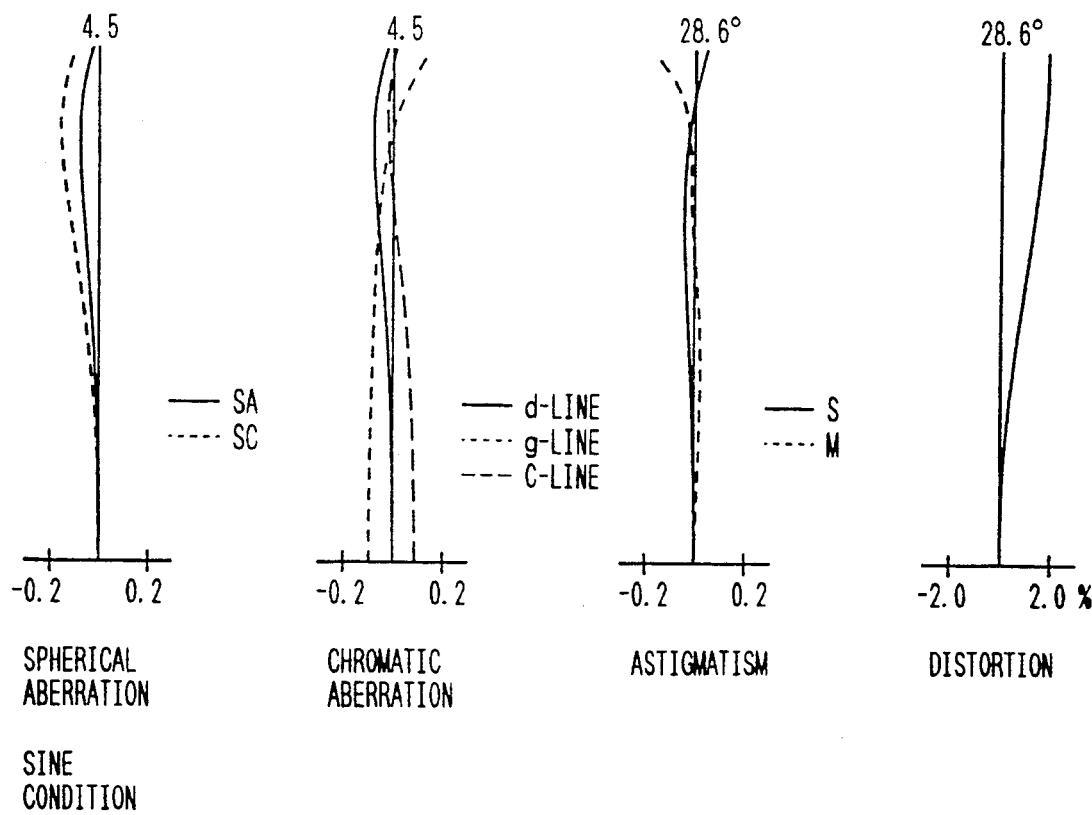
Figure 6B:
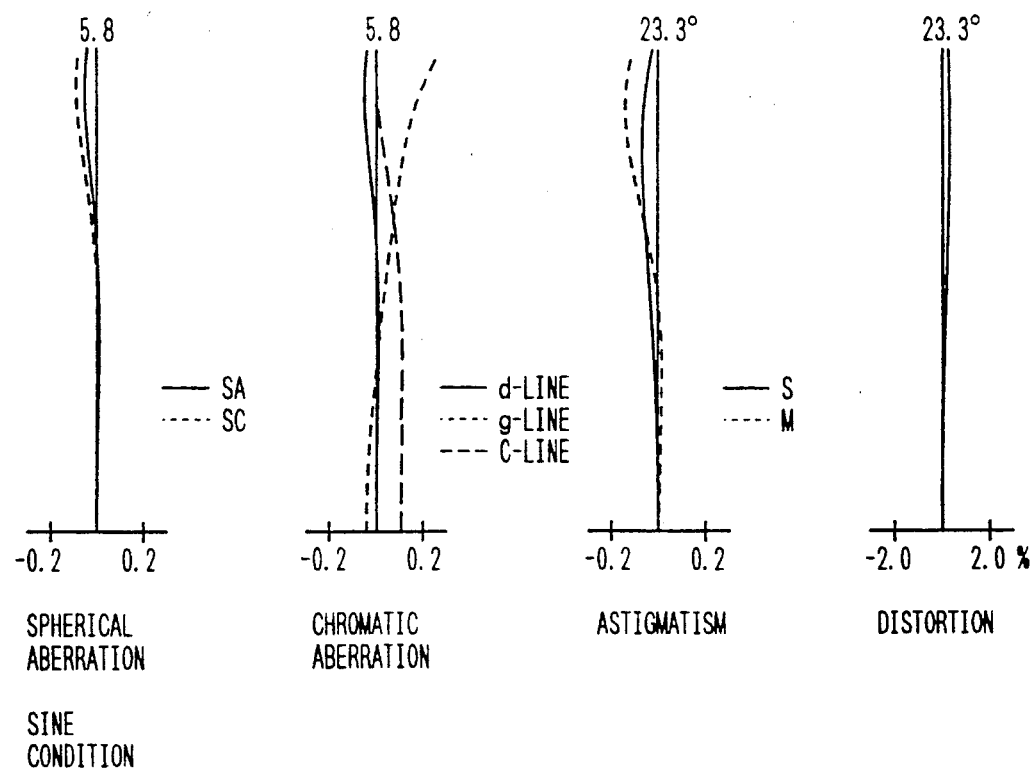
Figure 6C:
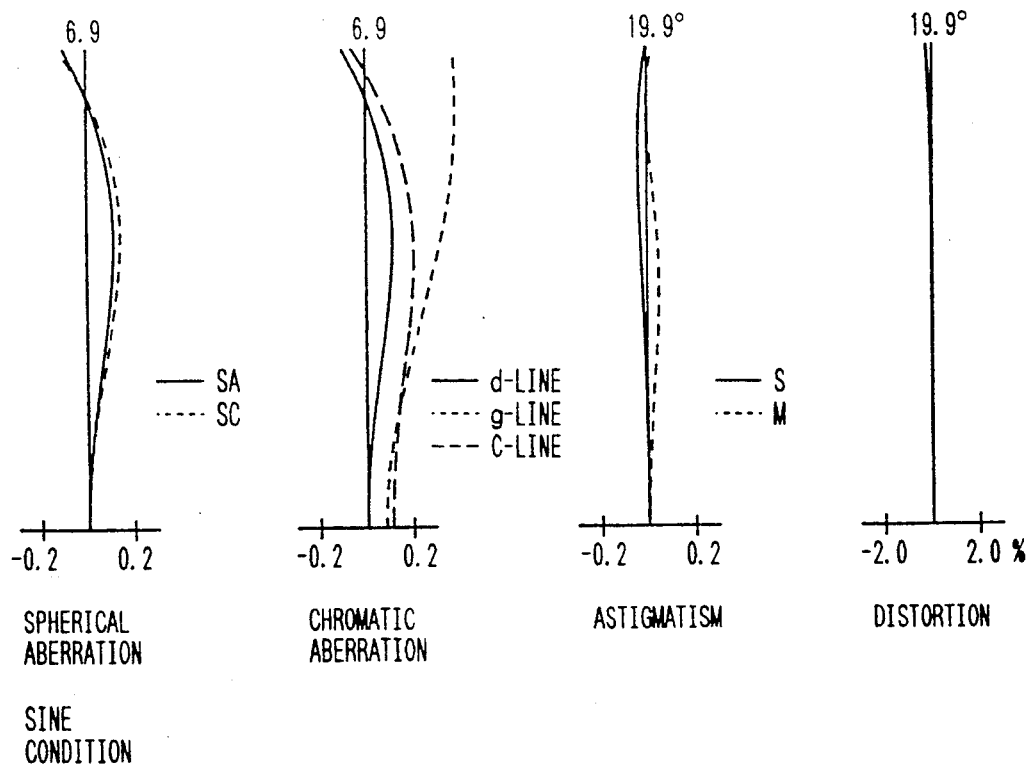

The zoom lens system of the present invention has a comparatively large back focus in consideration of its use with a compact camera. The overall length of this lens system is significantly reduced and yet efficient compensation for aberrations can be achieved by using inexpensive glass and plastic materials as well as aspheric lens surfaces.

Conditions (1) and (2) relate to the optical materials of which the positive first lens and the negative second lens in subgroup 1a are made. If either one of these conditions is not satisfied, lens manufacture at low cost cannot be realized.

Conditions (3) and (4) relate to the power distribution between subgroups 1a and 1bin the first lens group. These conditions require that subgroup 1a have a small power, with most of the power of the first lens group being provided by subgroup 1b.

If condition (3) is not satisfied, the result is favorable for the purpose of compactness but, on the other hand, a greater amount of de-focusing or deterioration of lens performance will occur in response to changes in temperature or humidity if a plastic material is used in subgroup 1a as will be described later in this specification.

Condition (4) is correlated to condition (3) and if its upper limit is exceeded, the positive power of subgroup 1b increases so much that not only does it become difficult to compensate for spherical and chromatic aberrations at the narrow-angle end but also the likelihood of the occurrence of higher-order aberrations will increase. If, on the other hand, the lower limit of condition (4) is not reached, the result is favorable for the purpose of effective compensation for aberrations but not for the purpose of compactness.

Condition (5) relates to the aspheric surface in subgroup 1a. As already mentioned, subgroup 1a has a small power but by using an aspheric surface having a divergent amount of asphericity with respect to a paraxial radius of curvature, not only is it possible to achieve effective compensation for spherical aberration within the first lens group but also the amount of change in spherical aberration that occurs during zooming can be reduced even if the power of subgroup 1a or its size is reduced. The term "divergent" means that the radius of curvature decreases as the diameter of a concave surface increases whereas it increases as the diameter of a convex surface increases. If the upper limit of condition (5) is exceeded, the aspheric surface is not sufficiently effective in achieving satisfactory compensation for aberrations. If the lower limit of this condition is not reached, overcompensation will result to cause higher-order aberrations.

It is necessary here to add supplemental comments on the amount of change in the coefficient of a third-order aberration caused by an aspheric surface. An aspheric surface is generally expressed by the following equation:

$$x = \frac{cy^2}{1 + \sqrt{1 - c^2 y^2}} + a_4 y^4 + a_6 y^6 + a_8 y^8 + a_{10} y^{10} + \ldots$$

In the case where the focal length, f, is 1.0, or if $$X = \frac{x}{f}, Y = \frac{y}{f}, C = fc, A_4 = f^3 a_4, A_6 = f^5 a_6, A_8 = f^7 a_8,$$

$A_{10} = f^9 a_{10}$ are substituted into said equation, the result is:

$$X = \frac{CY^2}{1 + \sqrt{1 - C^2 Y^2}} + A_4 Y^4 + A_6 Y^6 + A_8 Y^8 + A_{10} Y^{10} + \ldots$$

The second and subsequent terms of this equation give the amount of aspheric surface and the coefficient $A_4$ in the second term has the following relationship with the coefficient of a third-order asphericity $\phi$:

$$\phi = 8(N' - N) A_4$$

where N is the refractive index of a lens surface before it is made aspheric and N' is the refractive index of the same surface after it is rendered aspheric.

The coefficient of a third-order asphericity introduces the following amounts of change in the coefficients of various third-order aberrations considered in the theory of aberrations:

$$\Delta I = h^4 \phi$$

$$\Delta II = h^3 \bar{h} \phi$$

$$\Delta III = h^2 \bar{h}^2 \phi$$

$$\Delta IV = h^2 \bar{h}^2 \phi$$

$$\Delta V = h \bar{h}^3 \phi$$

where
- I: the coefficient of spherical aberration;
- II: the coefficient of coma;
- III: the coefficient of astigmatism;
- IV: the coefficient of truncated spherical field curvature;
- V: the coefficient of distortion;
- h: the height of intercept of each lens surface by paraxial, on-axis rays; and
- $\bar{h}$: the height of intercept of each lens surface by paraxial, off-axis rays passing through the center of the pupil.

The shape of an aspheric surface may be expressed in various other ways using conicity coefficients or odd-numbered order terms and satisfactory approximation can be made using only even-numbered order terms if y is smaller than a paraxial radius of curvature. Hence, it should be noted that one cannot depart from the scope of the present invention merely by using equations for the shape of an aspheric surface that are different from the one described above.

Another feature of the present invention is that if lenses of a comparatively small power in each of the first and second lens groups is made of a plastic material, the amount of defocusing or deterioration in lens performance is small despite possible changes in temperature or humidity. In addition, the overall weight of the lens system can be reduced. Further, it is easy to make an aspheric surface of plastic lenses and this contributes to an improvement in lens performance.

Supplemental comments are also necessary on the amount of defocusing with plastic lenses that can occur in response to changes in temperature or humidity. Plastics will experience temperature- or humidity-dependent changes in linear expansion coefficient or refractive index that are at least about 10 times as great as ordinary glass materials. If the amount of change in the focal length of a plastic lens is written as $\Delta f$, the amount of defocusing $\Delta p$ can be expressed by:

$$\Delta p = \Delta f (m' - m)^2$$

where m' is the lateral magnification of the lens groups exclusive of and subsequent to the plastic lens, and m is the lateral magnification of the combination of the plastic lens and subsequent lens groups.

Thus, in the case where the positive first lens in subgroup 1a is made of a plastic material, $m' = m_{1a} \cdot 2 \cdot m_{1b} \cdot m_{2L}$ and $m = 0$ and the amount of defocusing in response to changes in temperature or humidity will become undesirably large if condition (6) is not met.

In the case where the negative second lens in subgroup 1a is made of a plastic material, $m' = m_{1b} \cdot m_{2L}$ and $m = m_{1a} \cdot 2 \cdot m_{1b} \cdot m_{2L}$ and the amount of defocusing in response to changes in temperature or humidity will become undesirably large if condition (7) is not met.

In case that both of the positive and negative lenses in subgroup 1a are formed of a plastic material since the amounts of defocusing with the two lenses are opposite in sign and cancel each other. In this case, $m' = m_{1b} \cdot m_{2L}$ and $m = 0$ and the amount of defocusing in response to changes in temperature or humidity will become undesirably large if condition (8) is not met. From the viewpoint of minimizing adverse effects such as the deformation of plastic materials, it is desirable that conditions (6) and (7) are also satisfied. It should, however, be noted that if the first lens in subgroup 1a is to be formed of a plastic material, it is preferably protected with a coating or filter from surface flaws and other defects that impair the appearance of the lens.

The foregoing description concerns the first lens group but it should be noted that lenses in the second group may also be formed of glass or plastic materials that have low indices of refraction. Conditions (9) and (10) relate to positive meniscus lens 2-1 on the object side of the second lens group. If condition (9) is not met, an inexpensive zoom lens system which is one of the objects of the present invention cannot be realized. If condition (10) is not met, the power of lens 2-1 becomes so strong that if it is made of a plastic material as described just below, the amount of defocusing or deterioration in lens performance in response to changes in temperature or humidity will become undesirably large. If condition (10) is not met, the positive power of lens 2-1 becomes so small as to introduce difficulty in compensating for chromatic aberration that may occur within the second lens group.

If positive meniscus lens 2-1 is to be made of a plastic material, it is preferred that the negative lens (second lens) in subgroup 1a is also made of a plastic material. If condition (11) is not met, the amount of defocusing in response to changes in temperature or humidity will become undesirably large.

For the purpose of realizing an inexpensive zoom lens system, the last lens 2-2 on the image side of the second lens group may also be made of a glass material of low refractive index that satisfied condition (12).

EXAMPLES

Examples 1-3 of the present invention are described below with reference to data sheets, wherein f denotes the focal length, $\omega$, half view angle, $f_B$, back focus, r, the radius of curvature of an individual lens surface, d, the thickness of an individual lens or the aerial distance between adjacent lens surfaces, N, the refractive index of an individual lens at the d-line, and $\nu$, the Abbe number of an individual lens. In the following data sheets, $\alpha_4$, $\alpha_6$ and $\alpha_8$ signify the four-, six- and eight-order coefficients of asphericity.

EXAMPLE 1

$F_{NO} = 1{:}4.5 - 5.8 - 6.9$  $f = 39.02 - 50.00 - 60.00$
$\omega = 28.5 - 23.3 - 19.8$  $f_B = 13.87 - 25.08 - 35.30$

| Surface No. | r | d | N | $\nu$ |
|---|---|---|---|---|
| 1 | 20.000 | 1.79 | 1.58904 | 53.2 |
| 2 | 26.641 | 1.27 | | |
| 3 | 1771.623 | 1.20 | 1.58547 | 29.9 (plastics) |
| 4* | 42.411 | 6.08 | | |
| 5 | 70.000 | 3.08 | 1.56883 | 56.3 |
| 6 | −10.315 | 1.38 | 1.80518 | 25.4 |
| 7 | −13.414 | 8.83 − 5.27 − 3.17 | | |
| 8* | −25.453 | 1.90 | 1.58547 | 29.9 (plastics) |
| 9 | −18.126 | 5.11 | | |
| 10 | −10.243 | 1.40 | 1.71700 | 47.9 |
| 11 | −39.123 | | | |

| Fourth aspheric surface | Eighth aspheric surface |
|---|---|
| $\alpha_4 = 0.11170069 \times 10^{-3}$ | $\alpha_4 = 0.38552622 \times 10^{-4}$ |
| $\alpha_6 = 0.48768624 \times 10^{-6}$ | $\alpha_6 = 0.53665934 \times 10^{-6}$ |
| $\alpha_8 = 0.16049200 \times 10^{-7}$ | $\alpha_8 = -0.83225666 \times 10^{-10}$ |

EXAMPLE 2

$F_{NO} = 1{:}4.5 - 5.8 - 6.9$  $f = 39.02 - 50.00 - 60.00$
$\omega = 28.5 - 23.3 - 19.8$  $f_B = 13.87 - 25.61 - 36.30$

| Surface No. | r | d | N | $\nu$ |
|---|---|---|---|---|
| 1 | 20.000 | 1.82 | 1.51633 | 64.1 |
| 2 | 26.228 | 1.42 | | |
| 3 | −323.262 | 1.20 | 1.49186 | 57.4 (plastics) |
| 4* | 50.830 | 6.39 | | |
| 5 | 69.994 | 3.19 | 1.55963 | 61.2 |
| 6 | −9.284 | 1.38 | 1.80518 | 25.4 |
| 7 | −13.135 | 9.50 − 5.50 − 3.13 | | |
| 8* | −26.547 | 1.90 | 1.58547 | 29.9 (plastics) |
| 9 | −17.852 | 4.84 | | |
| 10 | −9.951 | 1.40 | 1.58313 | 59.4 |
| 11 | −65.802 | | | |

| Fourth aspheric surface | Eighth aspheric surface |
|---|---|
| $\alpha_4 = 0.11530464 \times 10^{-3}$ | $\alpha_4 = 0.44356893 \times 10^{-4}$ |
| $\alpha_6 = 0.26590589 \times 10^{-6}$ | $\alpha_6 = 0.29611274 \times 10^{-6}$ |
| $\alpha_8 = 0.15997148 \times 10^{-7}$ | $\alpha_8 = 0.27092752 \times 10^{-8}$ |

EXAMPLE 3

$F_{NO} = 1{:}4.5 - 5.8 - 6.9$  $f = 39.00 - 50.00 - 60.00$
$\omega = 28.6 - 23.3 - 19.9$  $f_B = 13.34 - 24.80 - 35.21$

| Surface No. | r | d | N | $\nu$ |
|---|---|---|---|---|
| 1 | 20.986 | 1.500 | 1.49186 | 57.4 (plastics) |
| 2* | 29.028 | 2.063 | | |
| 3 | −29.571 | 1.217 | 1.58547 | 29.9 (plastics) |
| 4 | −56.743 | 6.448 | | |
| 5 | 57.586 | 3.490 | 1.70154 | 41.2 |
| 6 | −9.315 | 1.300 | 1.80518 | 25.4 |
| 7 | −19.599 | 9.370 − 5.468 − 3.163 | | |
| 8* | −21.660 | 1.900 | 1.58547 | 29.9 (plastics) |
| 9 | −15.477 | 4.882 | | |
| 10 | −10.798 | 1.400 | 1.71300 | 53.8 |
| 11 | −48.284 | | | |

| Fourth aspheric surface | Eighth aspheric surface |
|---|---|
| $\alpha_4 = 0.47598226 \times 10^{-4}$ | $\alpha_4 = 0.28932129 \times 10^{-4}$ |
| $\alpha_6 = -0.79170457 \times 10^{-7}$ | $\alpha_6 = 0.81877936 \times 10^{-7}$ |
| $\alpha_8 = 0.80726584 \times 10^{-8}$ | $\alpha_8 = 0.31988019 \times 10^{-8}$ |

Shown below are the values that are calculated for conditions (1)–(12) in each of Examples 1-3.

| Condition | Ex. 1 | Ex. 2 | Ex. 3 |
|---|---|---|---|
| (1) | 1.589 | 1.516 | 1.492 |
| (2) | 1.585 | 1.492 | 1.585 |
| (3) | 0.117 | 0.102 | 0.055 |
| (4) | 1.127 | 1.111 | 1.066 |
| (5) | −25.3 | −22.4 | −10.1 |
| (6) | glass | glass | 0.171 |
| (7) | 0.590 | 0.412 | 0.293 |
| (8) | glass + plastics | glass + plastics | 0.016 |
| (9) | 1.585 | 1.585 | 1.585 |
| (10) | 0.259 | 0.320 | 0.323 |
| (11) | 0.187 | 0.263 | 0.253 |
| (12) | 1.717 | 1.583 | 1.713 |

According to the present invention, it is possible to relatively increase the back focus as a zoom lens for a compact camera and to reduce the overall length of the system. In addition, it is possible to use an inexpensive material of glass and/or plastic with insuring a high performance.

What is claimed is:

1. In a zoom lens system for use with a compact camera that comprises, in order from the object side, a first lens group having a positive focal length and a second lens group having a negative focal length and which performs zooming by changing the distance between the first and second lens groups, the improvement wherein said first lens group comprises, in order from the object side, a subgroup 1a of a small power that is composed of a positive first lens and a negative second lens and a subgroup 1b of a large positive power that has a surface of a negative power on the image side, said subgroup 1a having at least one aspheric surface that has a divergent amount of a sphericity with respect to a paraxial radius of curvature satisfying the following condition (5), and said zoom lens system further satisfying the following conditions:

$$N_{1a-1} < 1.65 \quad (1)$$
$$N_{1a-2} < 1.65 \quad (2)$$

$$\frac{f_1}{|f_{1a}|} < 0.25 \quad (3)$$

$$0.9 < \frac{f_1}{f_{1b}} < 1.25 \quad (4)$$

$$-50 < \Delta I_{1a} < -5 \quad (5)$$

where:

$N_{1a-1}$: the refractive index at the d-line of the first lens in subgroup 1a;

$N_{1a-2}$: the refractive index at the d-line of the second lens in subgroup 1a;

$f_1$: the focal length of the first lens group;

$f_{1a}$: the focal length of subgroup 1a;

$f_{1b}$: the focal length of subgroup 1b; and $\Delta I_{1a}$: the amount of change in the coefficient of a third-order spherical aberration caused by the aspheric surface in subgroup 1a (i.e., an aberrational coefficient as calculated on the assumption that the focal length of the overall system at the wide-angle end is 1.0);

2. A zoom lens system according to claim 1 wherein the first lens in subgroup 1a is formed of a plastic material, with the following condition being further satisfied:

$$(m_{1a-2} \cdot m_{1b} \cdot m_{2L})^2 < 0.3 \quad (6)$$

where:

$m_{1a-2}$: the lateral magnification of the second lens in subgroup 1a;

$m_{1b}$: the lateral magnification of subgroup 1b; and $m_{2L}$: the lateral magnification of the second lens group at the narrow-angle end;

3. A zoom lens system according to claim 1 wherein the second lens is subgroup 1a is formed of a plastic material, with the following condition being further satisfied:

$$(m_{1b} \cdot m_{2L} - m_{1a-2} \cdot m_{1b} \cdot m_{2L})^2 < 0.6 \quad (7)$$

where $m_{1b}$: the lateral magnification of subgroup 1b;

$m_{2L}$: the lateral magnification of the second lens group at the narrow-angle end; and $m_{1a-2}$: the lateral magnification of the second lens in subgroup 1a;

4. A zoom lens system according to claim 1 wherein both the first and second lenses in subgroup 1a are formed of a plastic material, with the following condition being further satisfied:

$$(m_{1b} \cdot m_{2L})^2 < 0.3 \quad (8)$$

where $m_{1b}$: the lateral magnification of subgroup 1b; and $m_{2L}$: the lateral magnification of the second lens group at the narrow-angle end;

5. A zoom lens system according to claim 1 wherein the second lens group comprises, in order from the object side, a positive meniscus lens 2-1 having a convex surface directed toward the image side and a negative meniscus lens 2-2 having a concave surface directed toward the object side, which lens system further satisfies the following conditions;

$$N_{2-1} < 1.65 \quad (9)$$

$$0.1 < \frac{|f_2|}{f_{2-1}} < 0.5. \quad (10)$$

where:

$N_{2-1}$: the refractive index at the d-line of lens 2−1 in the second lens group;

$f_2$: the focal length of the second lens group; and $f_{2-1}$: the focal length of lens 2−1 in the second lens group;

6. A zoom lens system according to claim 5 wherein lens 2-1 in the second lens group is formed of a plastic material and satisfies the following conditions:

$$(m_{2-2L} - m_{2L})^2 < 0.5 \quad (11)$$

where $m_{2-2L}$: the lateral magnification of lens 2-2 in the second lens group at the narrow-angle end; and $m_{2L}$: the lateral magnification of the second lens group at the narrow-angle end.

7. A zoom lens system according to claim 5 which further satisfies the following condition:

$$N_{2-2} < 1.64 \quad (12)$$

where $N_{2-2}$: the refractive index at the d-line of lens 2-2 in the second lens group.

8. A zoom lens system according to claim 5 wherein said negative second lens in the subgroup 1a of the first lens group is formed of a plastic material, and lens 2-1 in the second lens group is formed of a plastic material and satisfies the following condition:

$$(m_{2-2L} - m_{2L})^2 < 0.5 \quad (11)$$

where $m_{2-2L}$: the lateral magnification of lens 2-2 in the second lens group at the narrow-angle end; and $m_{2L}$: the lateral magnification of the second lens group at the narrow-angle end.

9. In a two-group zoom lens system for use with a compact camera that consists essentially of, in order from the object side, a first lens group having a positive focal length and a second lens group having a negative focal length and which performs zooming by changing the distance between the first and second lens groups, the improvement wherein said first lens group comprises a plastic lens having a negative refractive power, and said second lens group comprises a plastic lens having a positive refractive power.

10. A zoom lens system according to claim 9, wherein said plastic lens having a positive refractive power is the only lens in said second lens having a positive refractive power.

11. A zoom lens system according to claim 9, wherein said plastic lens having a negative refractive power is the only lens in said first lens group having a negative refractive power.

12. A zoom lens system according to claim 9, said first lens group further comprising one or more plastic lenses having a negative refractive power, such that all said lenses in said first group having a negative refractive power are made of plastic.

13. A zoom lens system according to claim 9, said second lens group further comprising one or more plastic lenses having a positive refractive power, such that all said lenses in said second group having a positive refractive power are made of plastic.

14. A zoom lens system according to claim 9, wherein said first lens group further includes at least one lens of a positive refractive power that is made of glass, and said second lens group further includes at least one lens of a negative refractive power that is made of glass.

15. In a zoom lens system for use with a compact camera that comprises, in order from the object side, a first lens group having a positive focal length and a second lens group having a negative focal length and which performs zooming by changing the distance between the first and second lens groups, the improvement wherein said first lens group includes a first subgroup 1a having, in order from the object side, a positive first lens and a negative second lens, and as second subgroup 1b, said second lens group includes, in order from the object side, a positive lens 2-1 and a negative lens 2-2, said negative second lens of said first subgroup 1a of said first lens group and said positive lens 2-1 of said second lens group being made of plastic, said system meeting the following conditions:

$$(m_{1b} \cdot m_{2L} - m_{1a\text{-}2} \cdot m_{1b} \cdot m_{2L})^2 \geq 0.6. \tag{7}$$

$$(m_{2\text{-}2L} - m_{2L})^2 < 0.5 \tag{11}$$

where
- $m_{1a\text{-}2}$: the lateral magnification of the second lens in subgroup 1a;
- $m_{1b}$: the lateral magnification of subgroup 1b;
- $m_{2L}$: the lateral magnification of the second lens group at the narrow-angle end; and
- $m_{2\text{-}2L}$: the lateral magnification of lens 2−2 in the second lens group at the narrow-angle end.

16. In a two group zoom lens system for use with a compact camera that consists essentially of, in order from the object side, a first lens group having a positive focal length and a second lens group having a negative focal length, wherein
- the camera performs zooming by changing the distance between said first and second lens groups,
- said first lens group comprises a plastic lens interposed between two glass lenses,
- and said plastic lens and said glass lenses are disposed within a lens barrel such that said glass lenses substantially protect said plastic lens from humidity.

* * * * *